(12) United States Patent
Lemley et al.

(10) Patent No.: US 11,997,233 B2
(45) Date of Patent: *May 28, 2024

(54) AUTO SWITCH-CALL CENTER-BASED AUTOMATED INTERFACE WITH VOICE SWITCHES FOR VOICE SERVICE DIAGNOSTICS AND PROVISIONING

(71) Applicant: CenturyLink Intellectual Property LLC, Broomfield, CO (US)

(72) Inventors: Jaime D. Lemley, Apopka, FL (US); David Stegeman, Olathe, KS (US)

(73) Assignee: CenturyLink Intellectual Proper LLC, Broomfield, CO (US)

( * ) Notice: Subject to any disclaimer, the term of this patent is extended or adjusted under 35 U.S.C. 154(b) by 398 days.

This patent is subject to a terminal disclaimer.

(21) Appl. No.: 17/491,013

(22) Filed: Sep. 30, 2021

(65) Prior Publication Data
US 2023/0034159 A1 Feb. 2, 2023

Related U.S. Application Data

(60) Provisional application No. 63/226,519, filed on Jul. 28, 2021.

(51) Int. Cl.
*H04M 3/00* (2024.01)
*G06F 3/0482* (2013.01)
(Continued)

(52) U.S. Cl.
CPC ........ *H04M 3/5166* (2013.01); *G06F 3/0482* (2013.01); *G06F 3/0484* (2013.01);
(Continued)

(58) Field of Classification Search
CPC ... G06Q 30/015; G06Q 10/10; H04M 3/2272; H04M 3/42161; H04M 3/5191;
(Continued)

(56) References Cited

U.S. PATENT DOCUMENTS 6,823,479 B1 * 11/2004 McElhaney, Jr. ... H04L 41/0631
714/4.2
7,158,613 B2 * 1/2007 Dunbar ................ H04M 3/323
370/251

(Continued)

*Primary Examiner* — Rasha S Al Aubaidi

(57) ABSTRACT

Novel tools and techniques are provided for implementing call center-based automated interface with voice switches for voice service diagnostics and provisioning. In various embodiments, in response to receiving a request by a call center user to access a voice service customer account, a computing system may access information regarding the voice service customer account that is stored in a database, may identify a switch that is configured to control voice service to a customer premises associated with the customer, based at least in part on the accessed information, and may autonomously access, from other databases, information associated with the voice service customer account. The computing system may integrate the accessed information, may generate and present a user interface ("UI") displaying the accessed information, and may generate and present one or more options within the UI for the call center user to select to change features of the voice service.

20 Claims, 9 Drawing Sheets

(51) Int. Cl.
  *G06F 3/0484*  (2022.01)
  *G06F 9/54*  (2006.01)
  *G06F 16/25*  (2019.01)
  *H04M 3/42*  (2006.01)
  *H04M 3/51*  (2006.01)

(52) U.S. Cl.
  CPC .............. *G06F 9/54* (2013.01); *G06F 16/252* (2019.01); *H04M 3/42085* (2013.01); *H04M 3/5191* (2013.01)

(58) Field of Classification Search
  CPC ... H04M 3/42085; H04M 3/5166; G06F 9/54; G06F 16/252; G06F 3/0484; G06F 3/0482
  See application file for complete search history.

(56) References Cited

U.S. PATENT DOCUMENTS

| | | | | |
|---|---|---|---|---|
| 7,818,283 | B1 * | 10/2010 | Bajpay | H04L 43/0817 707/E17.005 |
| 8,675,822 | B2 * | 3/2014 | Rives | G06Q 10/06 379/9.03 |
| 2006/0227714 | A1 * | 10/2006 | Griffin | H04L 43/50 370/241 |
| 2007/0041554 | A1 * | 2/2007 | Newman | H04L 43/50 379/1.01 |
| 2008/0198754 | A1 * | 8/2008 | Savoor | H04L 43/50 370/245 |
| 2017/0339040 | A1 * | 11/2017 | Ganesan | H04L 43/0888 |

\* cited by examiner

| Feature Name | Code | Action |
|---|---|---|
| Call Waiting | CWT | Cancel Call Waiting must be removed first! |
| Three Way Calling | 3WC | Remove Bounce |
| Automatic Answer (CODD) | COD | Remove Bounce |
| Cancel Call Waiting | CCW | Remove Bounce |
| Touch Tone | DGT | |
| IPTV Caller ID Screen Pop-Up (IPTV) | AINDN IPTV | |
| InterLATA (Out of State Long Distance) | PIC 5046 Y | |
| Call Forward No Answer - ACTIVE | CFDA N NSCR 1 A 30 FIXRING 13211234567 | Remove Change |
| Call Forward Busy - ACTIVE | CFDA N NSCR 1 A 13211234567 | Remove Change |
| IntraLATA (Local Long Distance) | LPIC 5046 Y | |
| Call Trace | COT AMA | Remove Bounce |

Fig. 3B

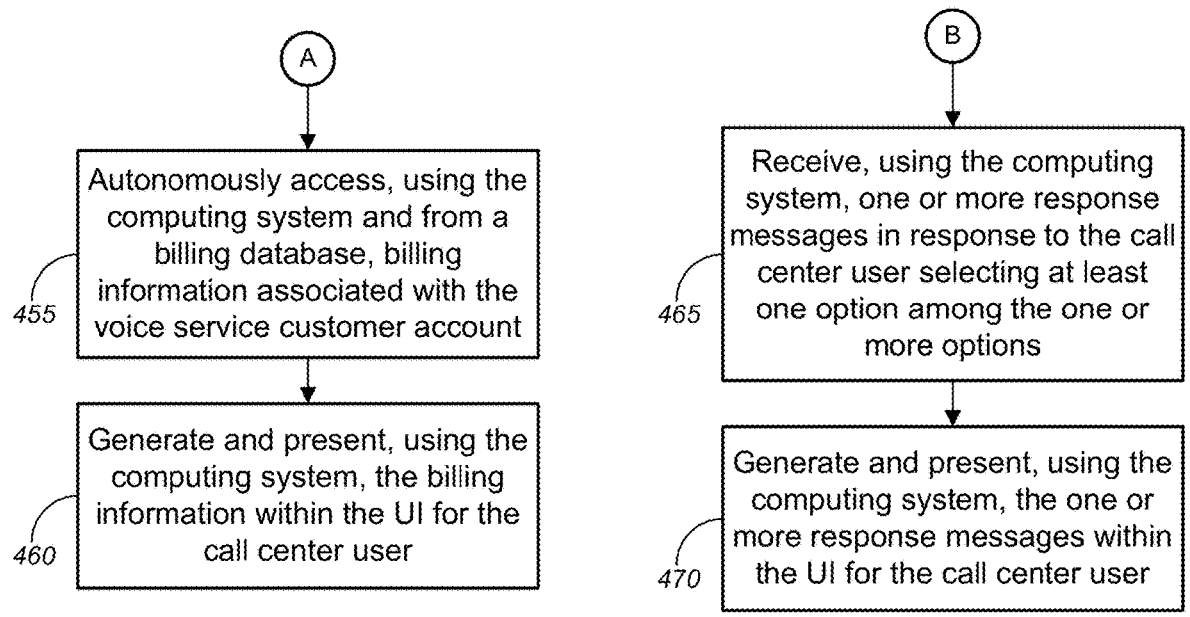

US 11,997,233 B2

AUTO SWITCH-CALL CENTER-BASED AUTOMATED INTERFACE WITH VOICE SWITCHES FOR VOICE SERVICE DIAGNOSTICS AND PROVISIONING

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing voice service diagnostics and provisioning, and, more particularly, to methods, systems, and apparatuses for implementing call center-based automated interface with voice switches for voice service diagnostics and provisioning (also referred to herein as "Auto Switch").

BACKGROUND

Conventional call centers (especially ones that support voice services, or the like) typically do not provide call center agents with the ability to see all aspects of services provided to a customer, much less provide such agents with the ability to fix mal-functioning or non-functioning features of such services. For instance, conventional call center systems have no direct access to billing systems, and thus do not provide call center agents with billing information without significant (and at times, time consuming) effort on the part of the agents. Further, conventional call center systems do not have access to the switches providing the voice services. In most cases, conventional call center agents must initiate a truck roll to dispatch field technicians to the customer premises, or the affected switches, or the like. Moreover, as there are no established systems and processes in place in conventional call centers, response to customer calls for help may differ from call center agent to call center agent, resulting in inconsistent (and in some cases, ineffectual) results and responses to the customer issues.

Hence, there is a need for more robust and scalable solutions for implementing voice service diagnostics and provisioning, and, more particularly, to methods, systems, and apparatuses for implementing call center-based automated interface with voice switches for voice service diagnostics and provisioning.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 3A and 3B are schematic diagrams illustrating various non-limiting examples of user interfaces ("UIs") may be used when implementing call center-based automated interface with voice switches for voice service diagnostics and provisioning, in accordance with various embodiments.

FIGS. 4A-4D are flow diagrams illustrating a method for implementing call center-based automated interface with voice switches for voice service diagnostics and provisioning, in accordance with various embodiments.

DETAILED DESCRIPTION OF CERTAIN EMBODIMENTS

Overview

Figure 1:
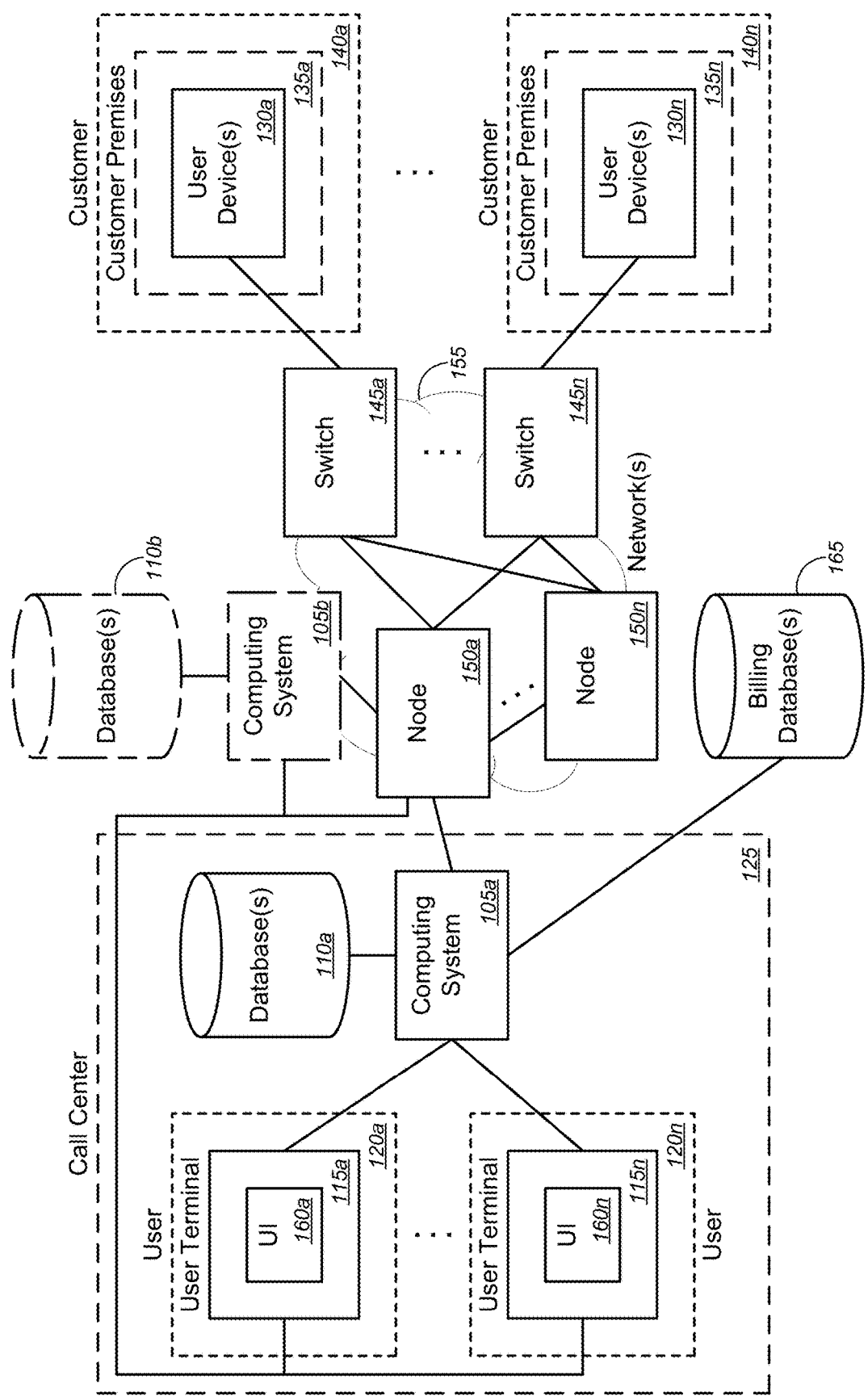
FIG. 1 is a schematic diagram illustrating a system for implementing call center-based automated interface with voice switches for voice service diagnostics and provisioning, in accordance with various embodiments.

Various embodiments provide tools and techniques for implementing voice service diagnostics and provisioning, and, more particularly, to methods, systems, and apparatuses for implementing call center-based automated interface with voice switches for voice service diagnostics and provisioning.

In various embodiments, a computing system may receive a request by a call center user to access a voice service customer account on behalf of a customer, the call center user being associated with the service provider that provides voice service to the customer. In response to receiving the request by the call center user to access the voice service customer account on behalf of the customer, the computing system may access information regarding the voice service customer account that is stored in a database. The computing system may identify at least one switch among a plurality of switches in a network that is configured to control voice service to a customer premises associated with the customer, based at least in part on the accessed information. In some cases, the voice service may comprise a plain old telephone service or plain ordinary telephone system ("POTS") service, and the network may comprise a public switched telephone network ("PSTN").

The computing system may autonomously access the identified at least one switch and may determine whether any errors have been identified and logged by the identified at least one switch. Based on a determination that one or more errors have been identified and logged by the identified at least one switch, the computing system may autonomously initiate one or more repair procedures to address the identified one or more errors. For each identified error that has been addressed by the one or more repair procedures, the computing system may generate a first message indicating that said identified error has been addressed. For each identified error that cannot be addressed by the one or more repair procedures, the computing system may generate a second message indicating that said identified error requires additional repair procedures.

The computing system may generate and present a user interface ("UI") displaying at least one of the accessed information regarding the voice service customer account, information regarding any identified errors that are logged by the at least one switch, the first message, or the second message, and/or the like. The computing system may generate and present one or more options within the UI for the call center user to select to change at least one of one or more features of the voice service customer account or one or more features of the voice service provided to the customer. In some instances, the UI may be generated and presented via a web portal to which the call center user is logged in.

In alternative aspects, the computing system may receive a request by a call center user to access a voice service customer account on behalf of a customer, the call center user being associated with a service provider that provides voice service to the customer. In response to receiving the request by the call center user to access the voice service customer account on behalf of the customer, the computing system may access information regarding the voice service customer account that is stored in a database. The computing system may identify at least one switch among a plurality of switches in a network that is configured to control voice service to a customer premises associated with the customer, based at least in part on the accessed information. The computing system may autonomously access, from a billing database, billing information associated with the voice service customer account. The computing system may integrate the accessed information regarding the voice service customer account with at least two of information regarding voice service provided to the customer, information regarding the identified switch, or the billing information associated with the voice service customer account, and/or the like. The computing system may generate and present a UI displaying the accessed information regarding the voice service customer account integrated with the at least two of the information regarding voice service provided to the customer, the information regarding the identified switch, or the billing information associated with the voice service customer account, and/or the like. The computing system may generate and present one or more options within the UI for the call center user to select to change at least one of one or more features of the voice service customer account or one or more features of the voice service provided to the customer, or the like.

In the various embodiments, the call center-based automated interface with voice switches for voice service diagnostics and provisioning may provide a uniform access to most, if not all, aspects of the voice service provided to the customer and/or the voice service customer account, and to integrate all accessed information within a UI presented and displayed to the call service user or agent. In some cases, the call center-based automated interface may autonomously access the respective databases and/or may autonomously access a switch(es) associated with the voice service. Alternatively, or additionally, the call center-based automated interface may provide options for the call service user or agent to affect changes to the voice service provided to the customer and/or the voice service customer account. As such, in most cases, truck rolls (i.e., dispatching field technicians, etc.) may be avoided, while quickly and efficiently addressing customer issues, resulting in better service to the customer and greater customer satisfaction.

These and other aspects of the call center-based automated interface with voice switches for voice service diagnostics and provisioning are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, voice network diagnostics technology, voice network provisioning technology, voice network diagnostics and provisioning technology, voice network service management technology, call center technology, and/or the like. In other aspects, certain embodiments, can improve the functioning of user equipment or systems themselves (e.g., voice network diagnostics system, voice network provisioning system, voice network diagnostics and provisioning system, voice network service management system, call center system, etc.), for example, by, in response to receiving a request by a call center user to access a voice service customer account on behalf of a customer, accessing, using a computing system, information regarding the voice service customer account that is stored in a database, the call center user being associated with a service provider that provides voice service to the customer; identifying, using the computing system, at least one switch among a plurality of switches in a network that is configured to control voice service to a customer premises associated with the customer, based at least in part on the accessed information; autonomously accessing, using the computing system, the identified at least one switch, and determining, using the computing system, whether any errors have been identified and logged by the identified at least one switch; based on a determination that one or more errors have been identified and logged by the identified at least one switch, autonomously initiating, using the computing system, one or more repair procedures to address the identified one or more errors; for each identified error that has been addressed by the one or more repair procedures, generating, using the computing system, a first message indicating that said identified error has been addressed; for each identified error that cannot be addressed by the one or more repair procedures, generating, using the computing system, a second message indicating that said identified error requires additional repair procedures; generating and presenting, using the computing system, a user interface ("UI") displaying at least one of the accessed information regarding the voice service customer account, information regarding any identified errors that are logged by the at least one switch, the first message, or the second message; and generating and presenting, using the computing system, one or more options within the UI for the call center user to select to change at least one of one or more features of the voice service customer account or one or more features of the voice service provided to the customer; and/or the like.

In particular, to the extent any abstract concepts are present in the various embodiments, those concepts can be implemented as described herein by devices, software, systems, and methods that involve specific novel functionality (e.g., steps or operations), such as, the call center-based automated interface with voice switches for voice service diagnostics and provisioning providing a uniform access to most, if not all, aspects of the voice service provided to the customer and/or the voice service customer account, and to integrate all accessed information within a UI presented and displayed to the call service user or agent; autonomously accessing the respective databases and/or a switch(es) associated with the voice service; and/or providing options for the call service user or agent to affect changes to the voice service provided to the customer and/or the voice service customer account. These functionalities can produce tangible results outside of the implementing computer system, including, merely by way of example, optimized response to customer calls for help with their voice services and/or accounts, in most cases, obviating truck rolls (i.e., dispatching field technicians, etc.), while quickly and efficiently addressing customer issues, resulting in better service to the customer and greater customer satisfaction, and/or the like, to name a few examples, that extend beyond mere conventional computer processing operations, and/or the like, at least some of which may be observed or measured by customers and/or service providers.

In an aspect, a method may comprise, in response to receiving a request by a call center user to access a voice service customer account on behalf of a customer, accessing, using a computing system, information regarding the voice service customer account that is stored in a database, the call center user being associated with a service provider that provides voice service to the customer; identifying, using the computing system, at least one switch among a plurality of switches in a network that is configured to control voice service to a customer premises associated with the customer, based at least in part on the accessed information; and autonomously accessing, using the computing system, the identified at least one switch, and determining, using the computing system, whether any errors have been identified and logged by the identified at least one switch. The method may also comprise, based on a determination that one or more errors have been identified and logged by the identified at least one switch, autonomously initiating, using the computing system, one or more repair procedures to address the identified one or more errors; for each identified error that has been addressed by the one or more repair procedures, generating, using the computing system, a first message indicating that said identified error has been addressed; and for each identified error that cannot be addressed by the one or more repair procedures, generating, using the computing system, a second message indicating that said identified error requires additional repair procedures. The method may further comprise generating and presenting, using the computing system, a user interface ("UT") displaying at least one of the accessed information regarding the voice service customer account, information regarding any identified errors that are logged by the at least one switch, the first message, or the second message; and generating and presenting, using the computing system, one or more options within the UI for the call center user to select to change at least one of one or more features of the voice service customer account or one or more features of the voice service provided to the customer.

In some embodiments, the computing system may comprise at least one of a voice network diagnostics computing system, a voice network provisioning computing system, a voice network service management computing system, a call center computing system, a server computer, a webserver, a cloud computing system, or a distributed computing system; and/or the like. In some cases, the voice service may comprise a plain old telephone service or plain ordinary telephone system ("POTS") service, and the network may be a public switched telephone network ("PSTN"). In some instances, the UI may be generated and presented via a web portal to which the call center user is logged in.

According to some embodiments, accessing the information regarding the voice service customer account that is stored in the database may comprise accessing the database via a first application programming interface ("API") between the computing system and the database, and autonomously accessing the identified at least one switch may comprise autonomously accessing the identified at least one switch via a second API between the computing system and each of the identified at least one switch.

In some embodiments, the one or more repair procedures may comprise at least one of: remote, network-based metallic line diagnostics and repair, initiated by the computing system, of copper lines between the identified at least one switch and the customer premises associated with the customer; remote, network-based switch level diagnostics and repair, initiated by the computing system, of the identified at least one switch; remote, network-based reconfiguration, initiated by the computing system, of the identified at least one switch; or remote, network-based reconfiguration, initiated by the computing system, of one or more nodes in the network that are communicatively coupled with the identified at least one switch; and/or the like.

According to some embodiments, the additional repair procedures may comprise at least one of: dispatching a technician associated with the service provider to perform on-site repair procedures at the customer premises; dispatching a technician associated with the service provider to perform on-site repair procedures at the at least one switch; or dispatching a technician associated with the service provider to perform on-site repair procedures at a physical location at which one or more nodes of the network are disposed; and/or the like.

Merely by way of example, in some cases, the accessed information regarding the voice service customer account may comprise at least one of: billing information associated with the voice service customer account; customer line information associated with the voice service customer account; line-specific information associated with the voice services provided to the customer; network profile information associated with the voice services provided to the customer; caller identification ("ID") name associated with the voice service customer account; identification information of each of the at least one switch; switch information for each of the at least one switch; information regarding active voice services among the voice services provided to the customer; information regarding one or more features of the active voice services among the voice services provided to the customer; information regarding inactive voice services among the voice services provided to the customer; information regarding one or more features of the inactive voice services among the voice services provided to the customer; information regarding voice service territory for the voice service provided to the customer; information regarding local dialing pattern; voicemail access number associated with the customer or the voice service customer account; information regarding message center login associated with the customer; information regarding any requested buried service wire ("BSW") tickets; or information regarding manual switch access for each of the at least one switch; and/or the like.

In some embodiments, the one or more options for changing one or more features of the voice service customer account may comprise at least one of: one or more options for manually initiating switch login with the at least one switch; one or more options for editing billing information associated with the voice service customer account; one or more options for updating contact information for the customer; one or more options for performing a local dialing pattern search; or one or more options for changing the one or more features of the voice service customer account; and/or the like.

According to some embodiments, the one or more options for changing one or more features of the voice service may comprise at least one of: one or more options for adding, setting up, changing, or removing a call waiting feature of the voice service; one or more options for adding, setting up, changing, or removing a cancel call waiting feature of the voice service; one or more options for adding, setting up, changing, or removing a three-way calling feature of the voice service; one or more options for adding, setting up, changing, or removing an automatic answer feature of the voice service; one or more options for adding, setting up, changing, or removing a call forwarding with no answer feature of the voice service; one or more options for adding, setting up, changing, or removing a call forwarding with busy message feature of the voice service; one or more options for adding, setting up, changing, or removing a call trace feature of the voice service; one or more options for adding, setting up, changing, or removing an anonymous call reject feature of the voice service; one or more options for adding, setting up, changing, or removing a voicemail feature of the voice service; one or more options for adding, setting up, changing, or removing an Internet Protocol television ("IPTV") caller identification ("ID") screen pop-up feature of the voice service; one or more options for adding, setting up, changing, or removing a long distance toll or inter local access and transport area ("interLATA") feature of the voice service; one or more options for adding, setting up, changing, or removing a local long distance ("intraLATA") feature of the voice service; or one or more options for manually initiating switch login with the at least one switch; and/or the like.

In some embodiments, the method may further comprise: autonomously accessing, using the computing system and from a billing database, billing information associated with the voice service customer account; and generating and presenting, using the computing system, the billing information within the UI for the call center user.

Alternatively, or additionally, the method may further comprise: receiving, using the computing system, one or more response messages in response to the call center user selecting at least one option among the one or more options; and generating and presenting, using the computing system, the one or more response messages within the UI for the call center user. In some instances, the one or more response messages may comprise at least one of: a message indicating success without updated provisioning; a message indicating success with provisioning and available changes; a message indicating an application programming interface ("API") error; a message indicating a change feature error; a message indicating a missing nonce error; a message indicating an invalid nonce error; a message indicating success pertaining to NPA NXX; a message indicating success pertaining to telephone number ("TN") with no features; a message indicating success pertaining to TN with features and nonce; a message indicating an error pertaining to an unassigned TN with valid NPA NXX; a message indicating an error pertaining to an invalid NPA NXX; a message indicating an error pertaining to a missing required parameter; or a message indicating an error pertaining to an unsupported device; and/or the like.

In another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: in response to receiving a request by a call center user to access a voice service customer account on behalf of a customer, access information regarding the voice service customer account that is stored in a database, the call center user being associated with a service provider that provides voice service to the customer; identify at least one switch among a plurality of switches in a network that is configured to control voice service to a customer premises associated with the customer, based at least in part on the accessed information; autonomously access the identified at least one switch, and determine whether any errors have been identified and logged by the identified at least one switch; based on a determination that one or more errors have been identified and logged by the identified at least one switch, autonomously initiate one or more repair procedures to address the identified one or more errors; for each identified error that has been addressed by the one or more repair procedures, generate a first message indicating that said identified error has been addressed; for each identified error that cannot be addressed by the one or more repair procedures, generate a second message indicating that said identified error requires additional repair procedures; generate and present a user interface ("UI") displaying at least one of the accessed information regarding the voice service customer account, information regarding any identified errors that are logged by the at least one switch, the first message, or the second message; and generate and present one or more options within the UI for the call center user to select to change at least one of one or more features of the voice service customer account or one or more features of the voice service provided to the customer.

In some embodiments, the apparatus may comprise at least one of a voice network diagnostics computing system, a voice network provisioning computing system, a voice network service management computing system, a call center computing system, a server computer, a webserver, a cloud computing system, or a distributed computing system; and/or the like. In some cases, the voice service may comprise a plain old telephone service or plain ordinary telephone system ("POTS") service, and the network may be a public switched telephone network ("PSTN").

In yet another aspect, a system might comprise a plurality of switches in a network and a computing system. The computing system might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: in response to receiving a request by a call center user to access a voice service customer account on behalf of a customer, access information regarding the voice service customer account that is stored in a database, the call center user being associated with a service provider that provides voice service to the customer; identify at least one switch among the plurality of switches in the network that is configured to control voice service to a customer premises associated with the customer, based at least in part on the accessed information; autonomously access the identified at least one switch, and determine whether any errors have been identified and logged by the identified at least one switch; based on a determination that one or more errors have been identified and logged by the identified at least one switch, autonomously initiate one or more repair procedures to address the identified one or more errors; for each identified error that has been addressed by the one or more repair procedures, generate a first message indicating that said identified error has been addressed; for each identified error that cannot be addressed by the one or more repair procedures, generate a second message indicating that said identified error requires additional repair procedures; generate and present a user interface ("UI") displaying at least one of the accessed information regarding the voice service customer account, information regarding any identified errors that are logged by the at least one switch, the first message, or the second message; and generate and present one or more options within the UI for the call center user to select to change at least one of one or more features of the voice service customer account or one or more features of the voice service provided to the customer.

According to some embodiments, the computing system may comprise at least one of a voice network diagnostics computing system, a voice network provisioning computing system, a voice network service management computing system, a call center computing system, a server computer, a webserver, a cloud computing system, or a distributed computing system; and/or the like. In some cases, the voice service may comprise a plain old telephone service or plain ordinary telephone system ("POTS") service, wherein the network may be a public switched telephone network ("PSTN").

In still another aspect, a method may comprise: in response to receiving a request by a call center user to access a voice service customer account on behalf of a customer, accessing, using a computing system, information regarding the voice service customer account that is stored in a database, the call center user being associated with a service provider that provides voice service to the customer; identifying, using the computing system, at least one switch among a plurality of switches in a network that is configured to control voice service to a customer premises associated with the customer, based at least in part on the accessed information; and autonomously accessing, using the computing system and from a billing database, billing information associated with the voice service customer account. The method may further comprise integrating, using the computing system, the accessed information regarding the voice service customer account with at least two of information regarding voice service provided to the customer, information regarding the identified switch, or the billing information associated with the voice service customer account; generating and presenting, using the computing system, a user interface ("UI") displaying the accessed information regarding the voice service customer account integrated with the at least two of the information regarding voice service provided to the customer, the information regarding the identified switch, or the billing information associated with the voice service customer account; and generating and presenting, using the computing system, one or more options within the UI for the call center user to select to change at least one of one or more features of the voice service customer account or one or more features of the voice service provided to the customer.

In some embodiments, the computing system may comprise at least one of a voice network diagnostics computing system, a voice network provisioning computing system, a voice network service management computing system, a call center computing system, a server computer, a webserver, a cloud computing system, or a distributed computing system; and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing voice service diagnostics and provisioning, and, more particularly, to methods, systems, and apparatuses for implementing call center-based automated interface with voice switches for voice service diagnostics and provisioning, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing call center-based automated interface with voice switches for voice service diagnostics and provisioning, in accordance with various embodiments.

In the non-limiting embodiment of FIG. 1, system 100 might comprise a computing system 105*a* and a data store or database 110*a* that is local to the computing system 105*a*. In some cases, the database 110*a* might be external, yet communicatively coupled, to the computing system 105*a*. In other cases, the database 110*a* might be integrated within the computing system 105*a*. System 100 may further comprise one or more user terminals 115a-115n (collectively, "user terminals 115" or the like) that are operated by corresponding one or more users 120a-120n (collectively, "users 120" or the like). The computing system 105a and corresponding database(s) 110a, as well as the user terminals 115a-115n may be disposed at call center 125, which may be a facility in which a service provider assembles a number of users 120 (also referred to as, "call center agents," "agents," "customer service representatives," or "representatives," or the like"). Alternatively, or additionally, at least some of the user terminals 115 and users 120 may be networked together through the call center 125 (e.g., via virtual private networks ("VPNs"), or the like), without having to be physically present within the physical building(s) or campus(es) of the call center 125 (e.g., for telecommuting, teleworking, or remote working, etc.).

In some embodiments, system 100 may further comprise one or more user devices 130a-130n (collectively, "user devices 130" or the like) that are disposed at corresponding customer premises 135a-135n (collectively, "customer premises 135" or the like), each associated with a customer among a plurality of customers 140a-140n (collectively, "customers 140" or the like). System 100 may further comprise a plurality of switches 145a-145n (collectively, "switches 145" or the like) and a plurality of nodes 150a-150n (collectively, "nodes 150" or the like), both disposed within a network(s) 155 operated (and in some cases also owned) by the service provider.

According to some embodiments, the computing system 105a may include, without limitation, at least one of a voice network diagnostics computing system, a voice network provisioning computing system, a voice network service management computing system, or a call center computing system, and/or the like. Alternative or additional to the computing system 105a and corresponding database 110a being disposed within call center 125, system 100 might comprise remote computing system 105b and corresponding database(s) 110b that communicatively couple with the one or more user terminals 115a-115n at call center 125 via the network(s) 155 and via at least one node 150 (in this case, node 150a, or the like). In some embodiments, remote computing system 105b might comprise at least one of a server computer, a webserver, a cloud computing system, or a distributed computing system, and/or the like. In some cases, the user terminals may each include, but is not limited to, at least one of a telephone, a headset, a desktop computer, a laptop computer, or a tablet computer, and/or the like. In some instances, the user devices 130 might each include, without limitation, one of a laptop computer, a tablet computer, a smart phone, a mobile phone, or a residential or office telephone, and/or the like. In some cases, customer premises 135, which might each include one of a single family house, a multi-dwelling unit ("MDU") within a multi-dwelling complex (including, but not limited to, an apartment building, an apartment complex, a condominium complex, a townhouse complex, a mixed-use building, etc.), a motel, an inn, a hotel, an office building or complex, a commercial building or complex, an industrial building or complex, and/or the like.

In some embodiments, network(s) 155 may each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 155 may include an access network of the service provider (e.g., an Internet service provider ("ISP")). In another embodiment, the network(s) 155 may include a core network of the service provider and/or the Internet.

In operation, computing system 105a and/or 105b (collectively, "computing system" or the like) may receive a request by a call center user (e.g., user 120, or the like) to access a voice service customer account on behalf of a customer (e.g., customer 140, or the like), the call center user being associated with the service provider that provides voice service to the customer. In response to receiving the request by the call center user to access the voice service customer account on behalf of the customer, the computing system may access information regarding the voice service customer account that is stored in a database (e.g., database(s) 110a and/or 110b, or the like). The computing system may identify at least one switch among a plurality of switches (e.g., switches 145, or the like) in a network (e.g., network(s) 155) that is configured to control voice service to a customer premises associated with the customer (e.g., customer premises 135, or the like), based at least in part on the accessed information. In some cases, the voice service may comprise a plain old telephone service or plain ordinary telephone system ("POTS") service, and the network may comprise a public switched telephone network ("PSTN").

The computing system may autonomously access the identified at least one switch and may determine whether any errors have been identified and logged by the identified at least one switch. Based on a determination that one or more errors have been identified and logged by the identified at least one switch, the computing system may autonomously initiate one or more repair procedures to address the identified one or more errors. For each identified error that has been addressed by the one or more repair procedures, the computing system may generate a first message indicating that said identified error has been addressed. For each identified error that cannot be addressed by the one or more repair procedures, the computing system may generate a second message indicating that said identified error requires additional repair procedures.

According to some embodiments, accessing the information regarding the voice service customer account that is stored in the database may comprise accessing the database via a first application programming interface ("API") between the computing system and the database, and autonomously accessing the identified at least one switch may comprise autonomously accessing the identified at least one switch via a second API between the computing system and each of the identified at least one switch.

In some embodiments, the one or more repair procedures may include, but are not limited to, at least one of: remote, network-based metallic line diagnostics and repair, initiated by the computing system, of copper lines between the identified at least one switch and the customer premises associated with the customer; remote, network-based switch level diagnostics and repair, initiated by the computing system, of the identified at least one switch; remote, network-based reconfiguration, initiated by the computing system, of the identified at least one switch; or remote, network-based reconfiguration, initiated by the computing system, of one or more nodes in the network that are communicatively coupled with the identified at least one switch; and/or the like.

According to some embodiments, the additional repair procedures may include, without limitation, at least one of: dispatching a technician associated with the service provider to perform on-site repair procedures at the customer premises; dispatching a technician associated with the service provider to perform on-site repair procedures at the at least one switch; or dispatching a technician associated with the service provider to perform on-site repair procedures at a physical location at which one or more nodes of the network are disposed.

Merely by way of example, in some cases, the accessed information regarding the voice service customer account may include, but is not limited to, at least one of: billing information associated with the voice service customer account; customer line information associated with the voice service customer account; line-specific information associated with the voice services provided to the customer; network profile information associated with the voice services provided to the customer; caller identification ("ID") name associated with the voice service customer account; identification information of each of the at least one switch; switch information for each of the at least one switch; information regarding active voice services among the voice services provided to the customer; information regarding one or more features of the active voice services among the voice services provided to the customer; information regarding inactive voice services among the voice services provided to the customer; information regarding one or more features of the inactive voice services among the voice services provided to the customer; information regarding voice service territory for the voice service provided to the customer; information regarding local dialing pattern; voicemail access number associated with the customer or the voice service customer account; information regarding message center login associated with the customer; information regarding any requested buried service wire ("BSW") tickets; or information regarding manual switch access for each of the at least one switch; and/or the like.

The computing system may generate and present a user interface ("UI"; e.g., a corresponding UI among UIs 160a-160n (collectively, "UIs 160" or the like) presented on corresponding user terminal among the plurality of user terminals 115a-115n, or the like) displaying at least one of the accessed information regarding the voice service customer account, information regarding any identified errors that are logged by the at least one switch, the first message, or the second message, and/or the like. The computing system may generate and present one or more options within the UI for the call center user to select to change at least one of one or more features of the voice service customer account or one or more features of the voice service provided to the customer. In some instances, the UI may be generated and presented via a web portal to which the call center user is logged in.

In some embodiments, the one or more options for changing one or more features of the voice service customer account may include, without limitation, at least one of: one or more options for manually initiating switch login with the at least one switch; one or more options for editing billing information associated with the voice service customer account; one or more options for updating contact information for the customer; one or more options for performing a local dialing pattern search; or one or more options for changing the one or more features of the voice service customer account; and/or the like.

According to some embodiments, the one or more options for changing one or more features of the voice service may include, but are not limited to, at least one of: one or more options for adding, setting up, changing, or removing a call waiting feature of the voice service; one or more options for adding, setting up, changing, or removing a cancel call waiting feature of the voice service; one or more options for adding, setting up, changing, or removing a three-way calling feature of the voice service; one or more options for adding, setting up, changing, or removing an automatic answer feature of the voice service; one or more options for adding, setting up, changing, or removing a call forwarding with no answer feature of the voice service; one or more options for adding, setting up, changing, or removing a call forwarding with busy message feature of the voice service; one or more options for adding, setting up, changing, or removing a call trace feature of the voice service; one or more options for adding, setting up, changing, or removing an anonymous call reject feature of the voice service; one or more options for adding, setting up, changing, or removing a voicemail feature of the voice service; one or more options for adding, setting up, changing, or removing an Internet Protocol television ("IPTV") caller identification ("ID") screen pop-up feature of the voice service; one or more options for adding, setting up, changing, or removing a long distance toll or inter local access and transport area ("interLATA") feature of the voice service; one or more options for adding, setting up, changing, or removing a local long distance ("intraLATA") feature of the voice service; or one or more options for manually initiating switch login with the at least one switch; and/or the like.

In some embodiments, the computing system may autonomously access, from a billing database (e.g., billing database 165, which may be communicatively coupled on at least one of computing system 105a and/or 105b, and may be disposed either at call center 125 and/or in network(s) 155, or the like), billing information associated with the voice service customer account. The computing system may generate and present the billing information within the UI for the call center user.

Alternatively, or additionally, the computing system may receive one or more response messages in response to the call center user selecting at least one option among the one or more options. The computing system may generate and present the one or more response messages within the UI for the call center user. In some cases, the one or more response messages may include, without limitation, at least one of: a message indicating success without updated provisioning; a message indicating success with provisioning and available changes; a message indicating an application programming interface ("API") error; a message indicating a change feature error; a message indicating a missing nonce error (where, herein, "nonce" refers to a one-time use token that is obtained when using a call for getting line information, that is consumed when using a call to change a feature, and that must be newly requested for additional provisioning checks, while "missing nonce error" refers to an error in nonce (e.g., token does not match, or the like)); a message indicating an invalid nonce error (where "invalid nonce error" refers to another error in nonce (e.g., a nonce token must be requested before performing a requested action, or the like)); a message indicating success pertaining to NPA NXX (where "NPA" refers to the North American Numbering Plan ("NANP") numbering plan area or area code, while "NXX" refers to the NANP central office or exchange code);

a message indicating success pertaining to telephone number ("TN") with no features; a message indicating success pertaining to TN with features and nonce; a message indicating an error pertaining to an unassigned TN with valid NPA NXX; a message indicating an error pertaining to an invalid NPA NXX; a message indicating an error pertaining to a missing required parameter; or a message indicating an error pertaining to an unsupported device; and/or the like.

In alternative aspects, the computing system may receive a request by a call center user to access a voice service customer account on behalf of a customer, the call center user being associated with a service provider that provides voice service to the customer. In response to receiving the request by the call center user to access the voice service customer account on behalf of the customer, the computing system may access information regarding the voice service customer account that is stored in a database. The computing system may identify at least one switch among a plurality of switches in a network that is configured to control voice service to a customer premises associated with the customer, based at least in part on the accessed information. The computing system may autonomously access, from a billing database, billing information associated with the voice service customer account. The computing system may integrate the accessed information regarding the voice service customer account with at least two of information regarding voice service provided to the customer, information regarding the identified switch, or the billing information associated with the voice service customer account, and/or the like. The computing system may generate and present a UI displaying the accessed information regarding the voice service customer account integrated with the at least two of the information regarding voice service provided to the customer, the information regarding the identified switch, or the billing information associated with the voice service customer account, and/or the like. The computing system may generate and present one or more options within the UI for the call center user to select to change at least one of one or more features of the voice service customer account or one or more features of the voice service provided to the customer, or the like.

These and other functions of the system 100 (and its components) are described in greater detail below with respect to FIGS. 2-4.

Figure 2:
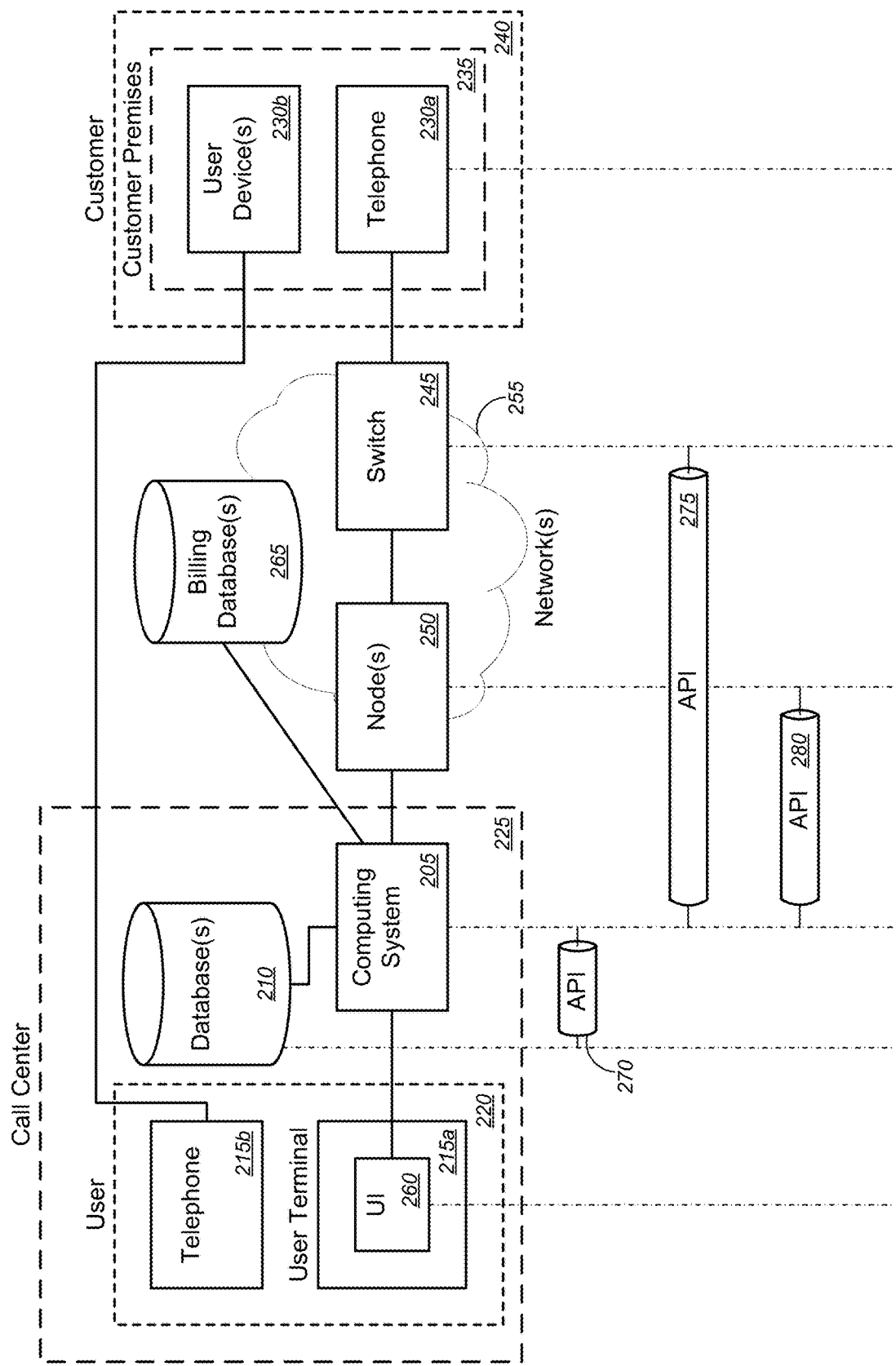
FIG. 2 is a schematic diagram illustrating a non-limiting example of use of application programming interfaces ("APIs") for implementing call center-based automated interface with voice switches for voice service diagnostics and provisioning, in accordance with various embodiments.

FIG. 2 is a schematic diagram illustrating a non-limiting example 200 of use of application programming interfaces ("APIs") for implementing call center-based automated interface with voice switches for voice service diagnostics and provisioning, in accordance with various embodiments.

With reference to the non-limiting example of FIG. 2, system 200 may comprise computing system 205 and corresponding database(s) 210, as well as user terminal 215a and telephone 215b associated with, or operated by, user 220. The computing system 205, database(s) 210, user terminal 215a, and telephone 215b may, in some cases, be disposed within call center 225 or accessed via call center 225. System 200 may further comprise telephone 230a and user device(s) 230b disposed within customer premises 235 associated with customer 240. System 200 may further comprise switch 245 and node(s) 250 disposed within network(s) 255. UI 260 may be presented on user terminal 215a, while billing database(s) 265 may be accessible by computing system 205. The computing system 205, the database(s) 210, user terminal 215a (and telephone 215b), the user 220, the call center 225, the user device(s) 230b (and the telephone 230a), the customer premises 235, the customer 240, the switch 245, the node(s) 250, the network(s) 255, the UI 260, and the billing database(s) 265 of system 200 in FIG. 2 are otherwise similar, if not identical, to the computing system 105a and 105b, the database(s) 110a and 110b, user terminals 115a-115n, the users 120a-120n, the call center 125, the user device(s) 130a-130n, the customer premises 135a-135n, the customers 140a-140n, the switches 145a-145n, the node(s) 150a-150n, the network(s) 155, the UIs 160a-160n, and the billing database(s) 165, respectively, of system 100 in FIG. 1, and the descriptions of these components of system 100 are applicable to the corresponding components of system 200, respectively.

Further to the embodiments as described above with respect to FIG. 1, accessing the information regarding the voice service customer account that is stored in the database may comprise accessing the database via a first application programming interface ("API") (e.g., API 270, or the like) between the computing system (e.g., computing system 205, or the like) and the database(s) (e.g., database(s) 210, or the like). Likewise, autonomously accessing the identified at least one switch may comprise autonomously accessing the identified at least one switch (e.g., switch 245, or the like) via a second API (e.g., API 275, or the like) between the computing system (e.g., computing system 205, or the like) and each of the identified at least one switch (e.g., switch 245, or the like). Similarly, the computing system (e.g., computing system 205, or the like) may autonomously access nodes (e.g., node(s) 250, or the like) of the network (e.g., network(s) 255, or the like) via a third API (e.g., API 280, or the like).

Figure 3A:
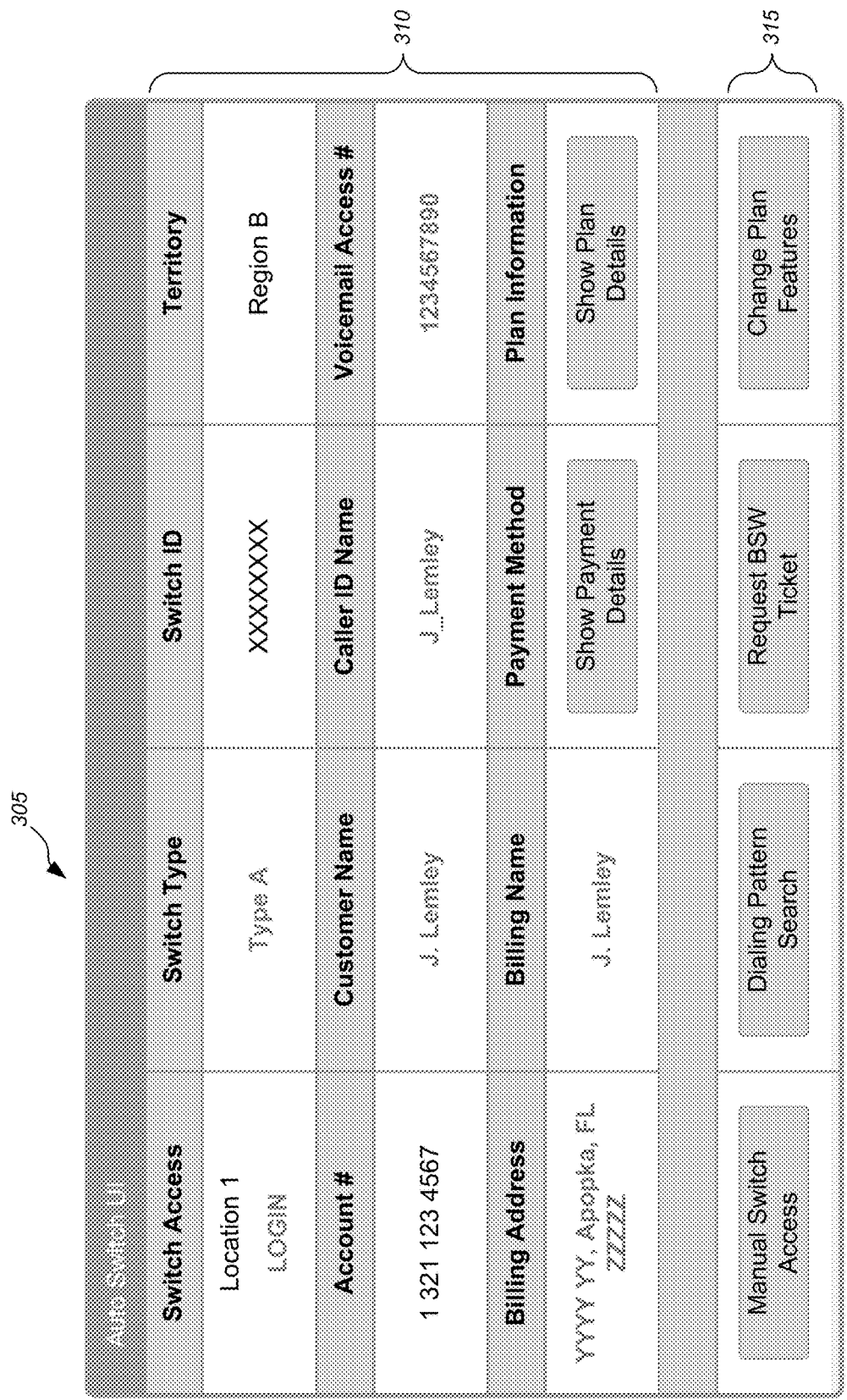

FIGS. 3A and 3B (collectively, "FIG. 3") are schematic diagrams illustrating various non-limiting examples 300 of user interfaces ("UIs") may be used when implementing call center-based automated interface with voice switches for voice service diagnostics and provisioning, in accordance with various embodiments.

Referring to FIG. 3A, an Auto Switch UI 305 may be generated or presented to a user (similar to users 120a-120n and/or 220 of FIGS. 1 and 2, or the like). In the non-limiting example of FIG. 3A, the Auto Switch UI 305 may present information in data fields 310 and may present options 315. According to some embodiments, the data fields may include, without limitation, at least one of switch access data field, switch type data field, switch identification ("ID") data field, territory data field, account number data field, customer name data field, caller ID name data field, voicemail access number data field, billing address data field, billing name data field, payment method data field, or plan information data field, and/or the like. In some embodiments, the options 315 may include, but are not limited to, at least one of options to initiate manual switch access, options to perform dialing pattern search, options to request buried service wire ("BSW"), options to change plan features, and/or the like. In some cases, the UI 305 may include links for the user to select either to initiate other options or to edit data fields (as depicted in FIG. 3A by bold-faced, gray-colored text). In some instances, the UI 305 may include UI virtual buttons to allow the user to request that details of information be shown (e.g., in a separate window (not shown) or in an expanded portion of the UI (not shown), or the like).

Although not shown in FIG. 3A, other data fields or other data may include, without limitation, at least one of: other billing information associated with the voice service customer account; customer line information associated with the voice service customer account; line-specific information associated with the voice services provided to the customer; network profile information associated with the voice services provided to the customer; other switch information for the switch; information regarding active voice services among the voice services provided to the customer; information regarding one or more features of the active voice services among the voice services provided to the customer; information regarding inactive voice services among the voice services provided to the customer; information regarding one or more features of the inactive voice services among the voice services provided to the customer; other information regarding voice service territory for the voice service provided to the customer; information regarding local dialing pattern; information regarding message center login associated with the customer; information regarding any requested BSW tickets; or information regarding manual switch access for each of the switch; and/or the like.

Also, although not shown in FIG. 3A, other options may include, but are not limited to, at least one of: one or more other options for editing billing information associated with the voice service customer account; one or more other options for updating contact information for the customer; one or more other options for performing a local dialing pattern search; one or more other options for changing the one or more features of the voice service customer account; one or more options for adding, setting up, changing, or removing a call waiting feature of the voice service; one or more options for adding, setting up, changing, or removing a cancel call waiting feature of the voice service; one or more options for adding, setting up, changing, or removing a three-way calling feature of the voice service; one or more options for adding, setting up, changing, or removing an automatic answer feature of the voice service; one or more options for adding, setting up, changing, or removing a call forwarding with no answer feature of the voice service; one or more options for adding, setting up, changing, or removing a call forwarding with busy message feature of the voice service; one or more options for adding, setting up, changing, or removing a call trace feature of the voice service; one or more options for adding, setting up, changing, or removing an anonymous call reject feature of the voice service; one or more options for adding, setting up, changing, or removing a voicemail feature of the voice service; one or more options for adding, setting up, changing, or removing an Internet Protocol television ("IPTV") caller identification ("ID") screen pop-up feature of the voice service; one or more options for adding, setting up, changing, or removing a long distance toll or inter local access and transport area ("interLATA") feature of the voice service; one or more options for adding, setting up, changing, or removing a local long distance ("intraLATA") feature of the voice service; and/or the like.

Also, although not shown in FIG. 3A, the computing system may generate and present one or more response messages within the UI 305 for the call center user. In some cases, the one or more response messages may include, without limitation, at least one of: a message indicating success without updated provisioning; a message indicating success with provisioning and available changes; a message indicating an application programming interface ("API") error; a message indicating a change feature error; a message indicating a missing nonce error; a message indicating an invalid nonce error; a message indicating success pertaining to NPA NXX; a message indicating success pertaining to telephone number ("TN") with no features; a message indicating success pertaining to TN with features and nonce; a message indicating an error pertaining to an unassigned TN with valid NPA NXX; a message indicating an error pertaining to an invalid NPA NXX; a message indicating an error pertaining to a missing required parameter; or a message indicating an error pertaining to an unsupported device; and/or the like.

Turning to FIG. 3B, a UI 320 may be generated and presented to the user that displays plan features of the voice service provided to the customer (e.g., in response to the user selecting the option or virtual button for changing plan features such as shown in FIG. 3A, or the like). As shown in the non-limiting embodiment of FIG. 3B, the UI 320 may display plan features 325, corresponding codes 330, and corresponding actions or options 335. In some embodiments, the plan features 325 may include, but are not limited to, at least one of call waiting, three-way calling, automatic answer ("CODD"), cancel call waiting, touch tone, IPTV caller ID screen pop-up, interLATA (or out-of-state long distance), call forwarding with no answer, call forwarding with busy message, intraLATA (or local long distance), or call trace, and/or the like. The corresponding actions 335 may include, without limitation, options to remove or bounce features, options to remove or change features, or messages indicating actions that should be performed prior to any of the other options for some features, or the like. Although not shown, other options for changing one or more features may be presented in the UI 320.

These and other functions of the system 100 (and its components) are described in greater detail below with respect to FIGS. 1, 2, and 4.

FIGS. 4A-4D (collectively, "FIG. 4") are flow diagrams illustrating a method 400 for implementing call center-based automated interface with voice switches for voice service diagnostics and provisioning, in accordance with various embodiments. Method 400 of FIG. 4A continues onto FIG. 4B following the circular marker denoted, "A," and/or continues onto FIG. 4C following the circular marker denoted, "B." Alternatively, method 400 of FIG. 4D may continue onto FIG. 4C following the circular marker denoted, "B."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, and 300 of FIGS. 1, 2, and 3, respectively (or components thereof), such methods may also be implemented using any suitable hardware (or software) implementation. Similarly, while each of the systems, examples, or embodiments 100, 200, and 300 of FIGS. 1, 2, and 3, respectively (or components thereof), can operate according to the method 400 illustrated by FIG. 4 (e.g., by executing instructions embodied on a computer readable medium), the systems, examples, or embodiments 100, 200, and 300 of FIGS. 1, 2, and 3 can each also operate according to other modes of operation and/or perform other suitable procedures.

Figure 4A:
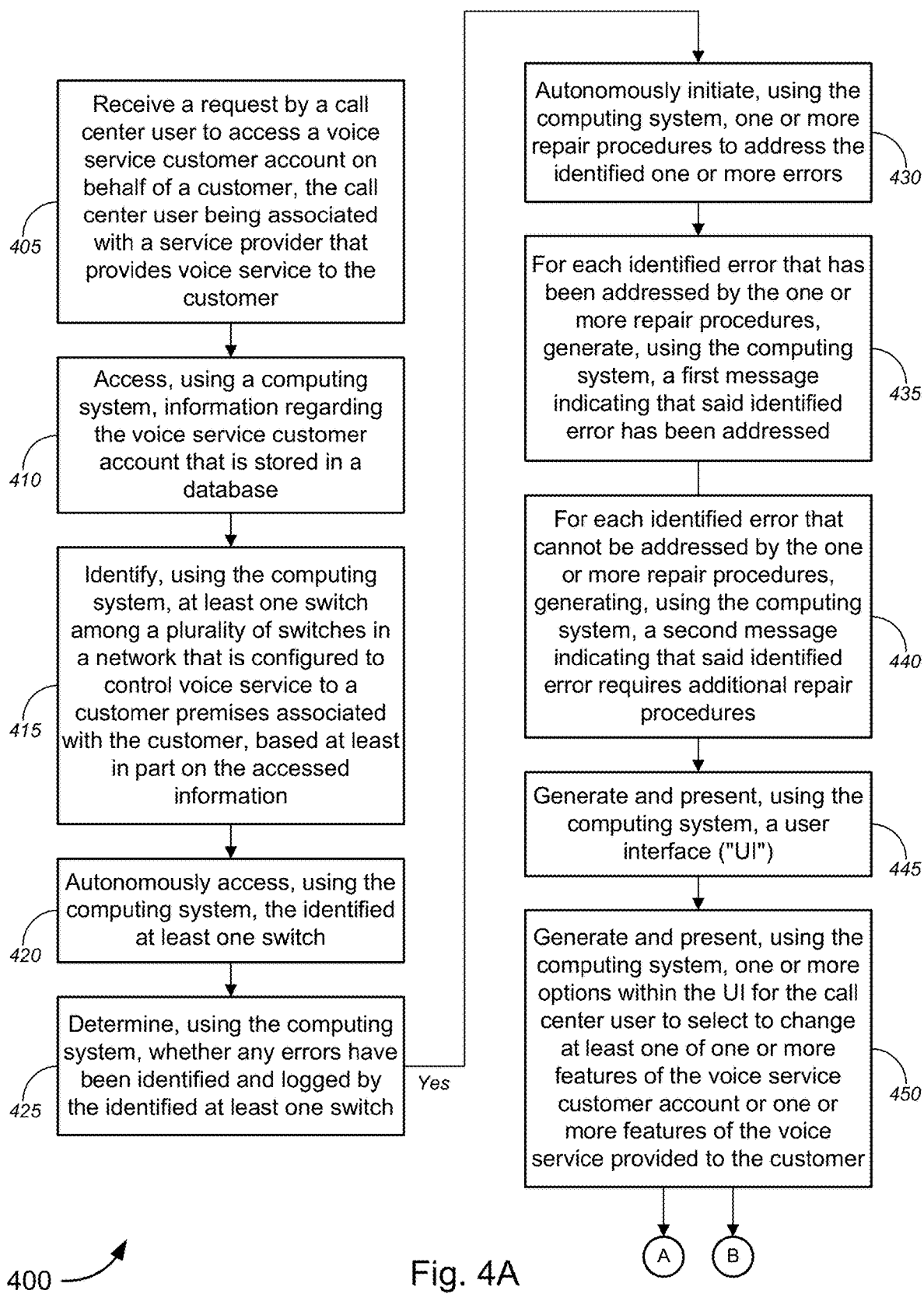

In the non-limiting embodiment of FIG. 4A, method 400, at block 405, may comprise receiving a request by a call center user to access a voice service customer account on behalf of a customer, the call center user being associated with a service provider that provides voice service to the customer. At block 410, method 400 may comprise, in response to receiving the request by the call center user to access the voice service customer account on behalf of the customer, accessing, using a computing system, information regarding the voice service customer account that is stored in a database. Method 400 may further comprise, at block 415, identifying, using the computing system, at least one switch among a plurality of switches in a network that is configured to control voice service to a customer premises associated with the customer, based at least in part on the accessed information.

In some embodiments, the computing system may include, without limitation, at least one of a voice network diagnostics computing system, a voice network provisioning computing system, a voice network service management computing system, a call center computing system, a server computer, a webserver, a cloud computing system, or a distributed computing system, and/or the like. In some cases, the voice service may comprise a plain old telephone service or plain ordinary telephone system ("POTS") service, and the network may comprise a public switched telephone network ("PSTN").

Method 400 may further comprise autonomously accessing, using the computing system, the identified at least one switch (block 420), and determining, using the computing system, whether any errors have been identified and logged by the identified at least one switch (block 425). At block 430, method 400 may comprise, based on a determination that one or more errors have been identified and logged by the identified at least one switch, autonomously initiating, using the computing system, one or more repair procedures to address the identified one or more errors. Method 400 may further comprise: for each identified error that has been addressed by the one or more repair procedures, generating, using the computing system, a first message indicating that said identified error has been addressed (block 435); and for each identified error that cannot be addressed by the one or more repair procedures, generating, using the computing system, a second message indicating that said identified error requires additional repair procedures (block 440).

According to some embodiments, accessing the information regarding the voice service customer account that is stored in the database (at block 410) may comprise accessing the database via a first application programming interface ("API") between the computing system and the database, and autonomously accessing the identified at least one switch (at block 420) may comprise autonomously accessing the identified at least one switch via a second API between the computing system and each of the identified at least one switch.

In some embodiments, the one or more repair procedures may include, but are not limited to, at least one of: remote, network-based metallic line diagnostics and repair, initiated by the computing system, of copper lines between the identified at least one switch and the customer premises associated with the customer; remote, network-based switch level diagnostics and repair, initiated by the computing system, of the identified at least one switch; remote, network-based reconfiguration, initiated by the computing system, of the identified at least one switch; or remote, network-based reconfiguration, initiated by the computing system, of one or more nodes in the network that are communicatively coupled with the identified at least one switch; and/or the like.

According to some embodiments, the additional repair procedures may include, without limitation, at least one of: dispatching a technician associated with the service provider to perform on-site repair procedures at the customer premises; dispatching a technician associated with the service provider to perform on-site repair procedures at the at least one switch; or dispatching a technician associated with the service provider to perform on-site repair procedures at a physical location at which one or more nodes of the network are disposed.

Merely by way of example, in some cases, the accessed information regarding the voice service customer account may include, but is not limited to, at least one of: billing information associated with the voice service customer account; customer line information associated with the voice service customer account; line-specific information associated with the voice services provided to the customer; network profile information associated with the voice services provided to the customer; caller identification ("ID") name associated with the voice service customer account; identification information of each of the at least one switch; switch information for each of the at least one switch; information regarding active voice services among the voice services provided to the customer; information regarding one or more features of the active voice services among the voice services provided to the customer; information regarding inactive voice services among the voice services provided to the customer; information regarding one or more features of the inactive voice services among the voice services provided to the customer; information regarding voice service territory for the voice service provided to the customer; information regarding local dialing pattern; voicemail access number associated with the customer or the voice service customer account; information regarding message center login associated with the customer; information regarding any requested buried service wire ("BSW") tickets; or information regarding manual switch access for each of the at least one switch; and/or the like.

At block 445, method 400 may comprise generating and presenting, using the computing system, a user interface ("UI") displaying at least one of the accessed information regarding the voice service customer account, information regarding any identified errors that are logged by the at least one switch, the first message, or the second message. Method 400, at block 450, may comprise generating and presenting, using the computing system, one or more options within the UI for the call center user to select to change at least one of one or more features of the voice service customer account or one or more features of the voice service provided to the customer. In some instances, the UI may be generated and presented via a web portal to which the call center user is logged in.

In some embodiments, the one or more options for changing one or more features of the voice service customer account may include, without limitation, at least one of: one or more options for manually initiating switch login with the at least one switch; one or more options for editing billing information associated with the voice service customer account; one or more options for updating contact information for the customer; one or more options for performing a local dialing pattern search; or one or more options for changing the one or more features of the voice service customer account; and/or the like.

According to some embodiments, the one or more options for changing one or more features of the voice service may include, but are not limited to, at least one of: one or more options for adding, setting up, changing, or removing a call waiting feature of the voice service; one or more options for adding, setting up, changing, or removing a cancel call waiting feature of the voice service; one or more options for adding, setting up, changing, or removing a three-way calling feature of the voice service; one or more options for adding, setting up, changing, or removing an automatic answer feature of the voice service; one or more options for adding, setting up, changing, or removing a call forwarding with no answer feature of the voice service; one or more options for adding, setting up, changing, or removing a call forwarding with busy message feature of the voice service; one or more options for adding, setting up, changing, or removing a call trace feature of the voice service; one or more options for adding, setting up, changing, or removing an anonymous call reject feature of the voice service; one or more options for adding, setting up, changing, or removing a voicemail feature of the voice service; one or more options for adding, setting up, changing, or removing an Internet Protocol television ("IPTV") caller identification ("ID") screen pop-up feature of the voice service; one or more options for adding, setting up, changing, or removing a long distance toll or inter local access and transport area ("inter-LATA") feature of the voice service; one or more options for adding, setting up, changing, or removing a local long distance ("intraLATA") feature of the voice service; or one or more options for manually initiating switch login with the at least one switch; and/or the like.

Method 400 may either continue onto the process at block 455 in FIG. 4B following the circular marker denoted, "A," and/or continue onto the process at block 465 in FIG. 4C following the circular marker denoted, "B."

At block 455 in FIG. 4B (following the circular marker denoted, "A," in FIG. 4A), method 400 may comprise autonomously accessing, using the computing system and from a billing database, billing information associated with the voice service customer account; and generating and presenting, using the computing system, the billing information within the UI for the call center user (block 460).

Alternatively, or additionally, at block 465 in FIG. 4C (following the circular marker denoted, "B," in FIG. 4A), method 400 may comprise receiving, using the computing system, one or more response messages in response to the call center user selecting at least one option among the one or more options; and generating and presenting, using the computing system, the one or more response messages within the UI for the call center user (block 470). In some cases, the one or more response messages may include, without limitation, at least one of: a message indicating success without updated provisioning; a message indicating success with provisioning and available changes; a message indicating an application programming interface ("API") error; a message indicating a change feature error; a message indicating a missing nonce error; a message indicating an invalid nonce error; a message indicating success pertaining to NPA NXX; a message indicating success pertaining to telephone number ("TN") with no features; a message indicating success pertaining to TN with features and nonce; a message indicating an error pertaining to an unassigned TN with valid NPA NXX; a message indicating an error pertaining to an invalid NPA NXX; a message indicating an error pertaining to a missing required parameter; or a message indicating an error pertaining to an unsupported device; and/or the like.

Figure 4D:
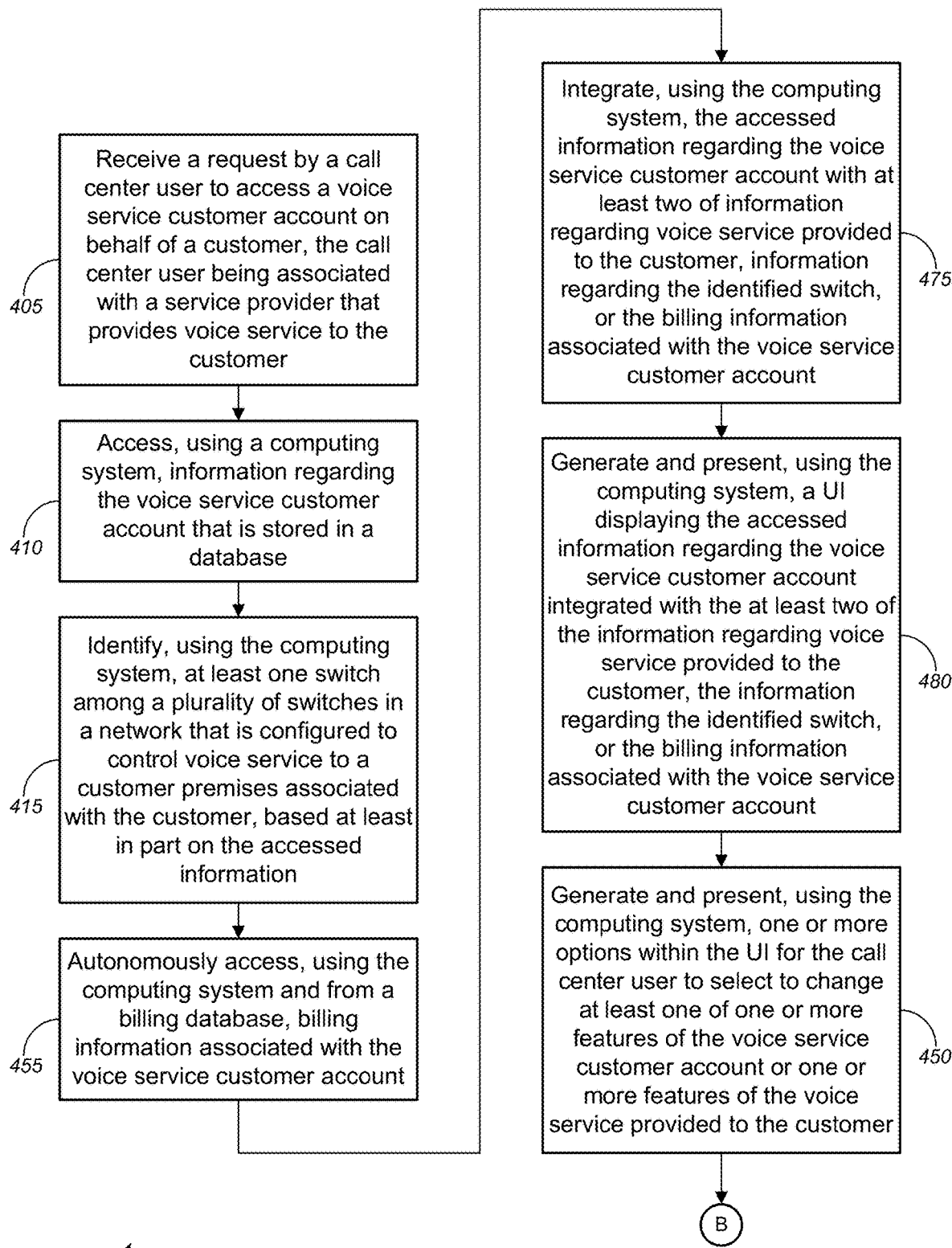

Alternatively, with reference to FIG. 4D, method 400, at block 405, may comprise receiving a request by a call center user to access a voice service customer account on behalf of a customer, the call center user being associated with a service provider that provides voice service to the customer. At block 410, method 400 may comprise, in response to receiving the request by the call center user to access the voice service customer account on behalf of the customer, accessing, using a computing system, information regarding the voice service customer account that is stored in a database. Method 400 may further comprise, at block 415, identifying, using the computing system, at least one switch among a plurality of switches in a network that is configured to control voice service to a customer premises associated with the customer, based at least in part on the accessed information.

At block 455, method 400 may comprise autonomously accessing, using the computing system and from a billing database, billing information associated with the voice service customer account. Method 400 may further comprise integrating, using the computing system, the accessed information regarding the voice service customer account with at least two of information regarding voice service provided to the customer, information regarding the identified switch, or the billing information associated with the voice service customer account (block 475). Method 400 may further comprise, at block 480, generating and presenting, using the computing system, a UI displaying the accessed information regarding the voice service customer account integrated with the at least two of the information regarding voice service provided to the customer, the information regarding the identified switch, or the billing information associated with the voice service customer account. Method 400, at block 450, may comprise generating and presenting, using the computing system, one or more options within the UI for the call center user to select to change at least one of one or more features of the voice service customer account or one or more features of the voice service provided to the customer.

Method 400 may continue onto the process at block 465 in FIG. 4C following the circular marker denoted, "B."

Method 400 as shown and described in FIG. 4D would otherwise be similar, if not identical to, method 400 as shown and described with respect to FIGS. 4A-4C.

Exemplary System and Hardware Implementation

Figure 5:
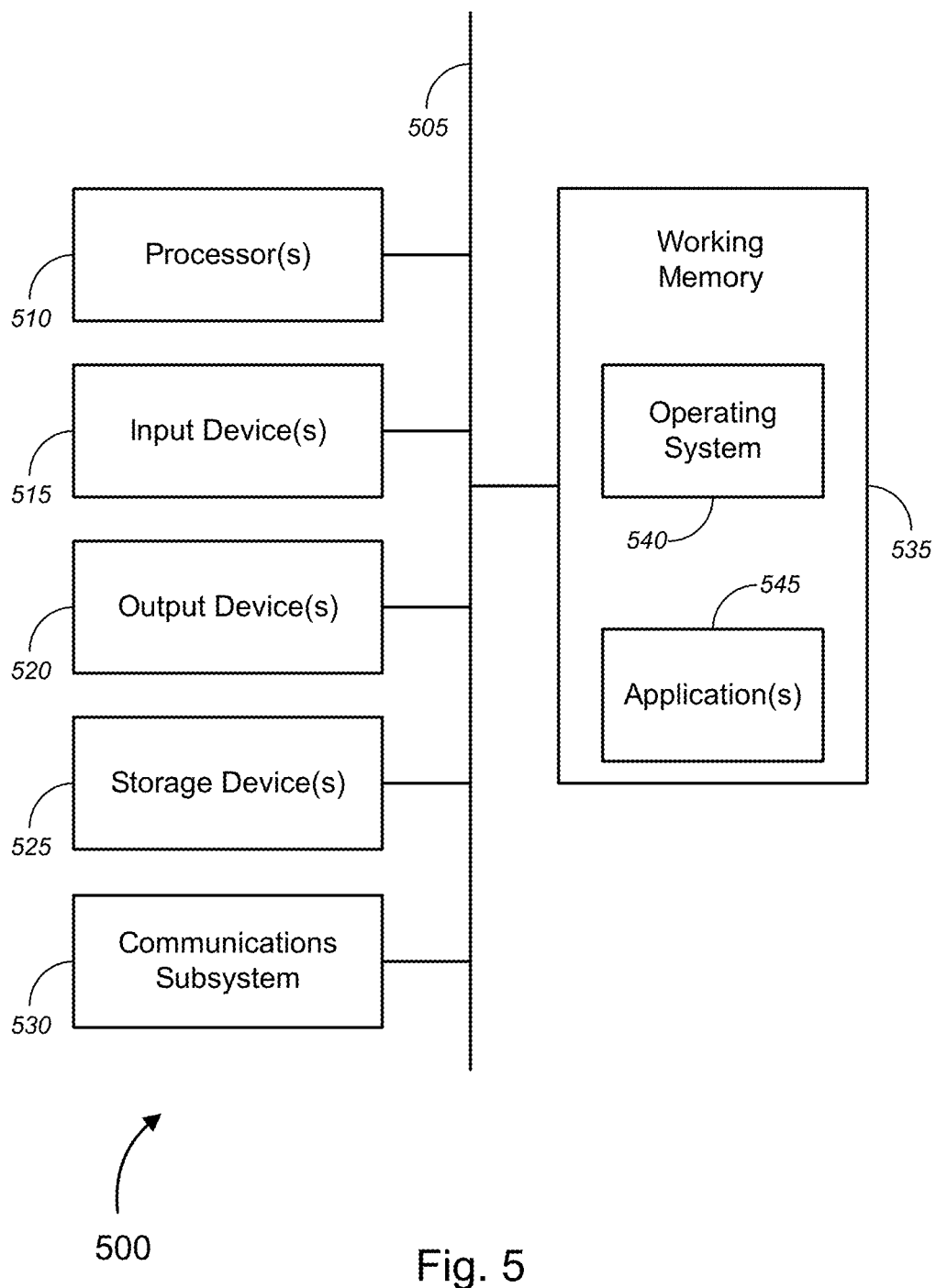
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing systems 105a, 105b, and 205, user terminals 115a-115n and 215a, switches 145a-145n and 245, nodes 150a-150n and 250, user devices 130a-130n and 230b, and telephones 215b and 230a, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing systems 105a, 105b, and 205, user terminals 115a-115n and 215a, switches 145a-145n and 245, nodes 150a-150n and 250, user devices 130a-130n and 230b, and telephones 215b and 230a, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
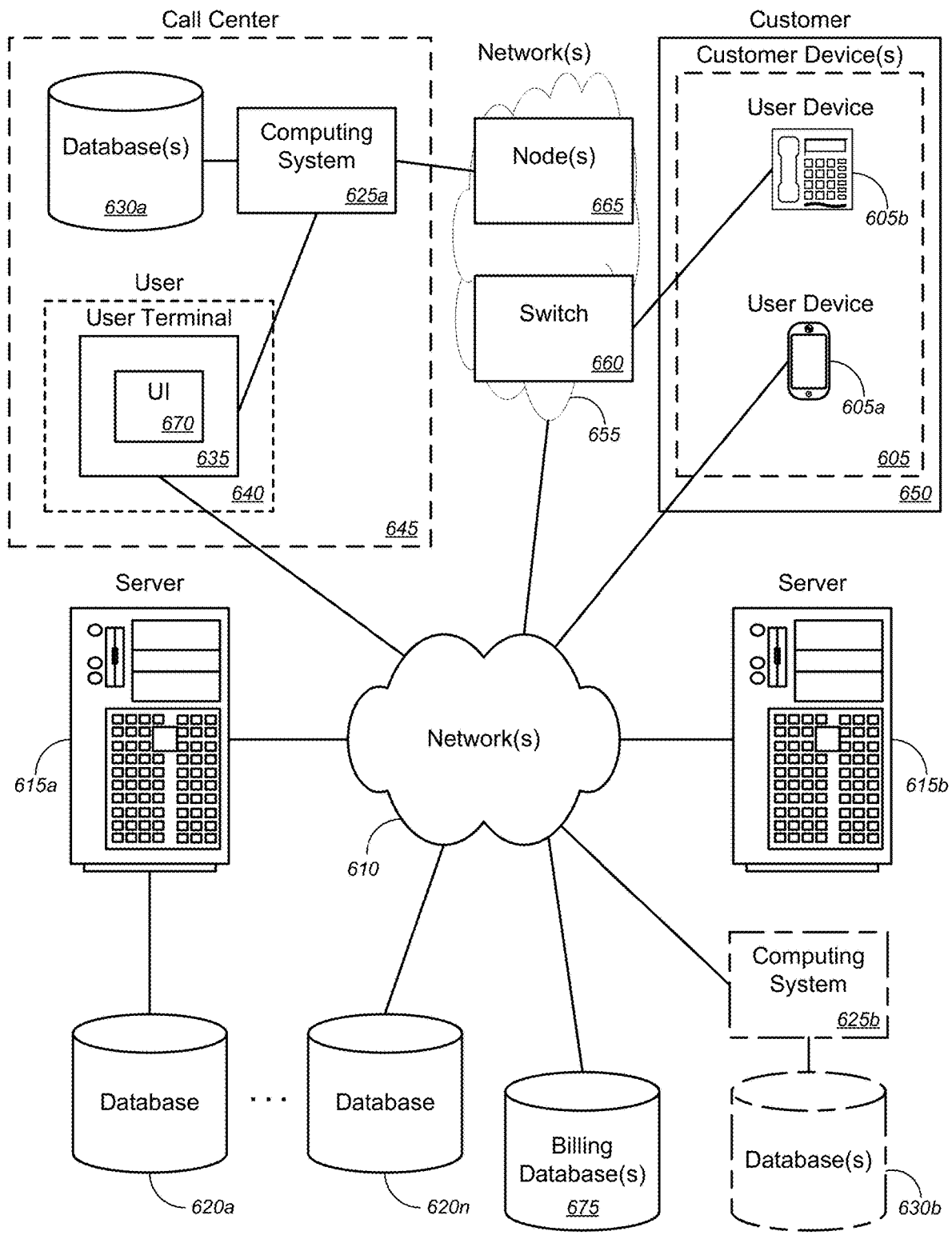
FIG. 6 is a block diagram illustrating a networked system of computers, computing systems, or system hardware architecture, which can be used in accordance with various embodiments.

As noted above, a set of embodiments comprises methods and systems for implementing voice service diagnostics and provisioning, and, more particularly, to methods, systems, and apparatuses for implementing call center-based automated interface with voice switches for voice service diagnostics and provisioning. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 155 and 255 of FIGS. 1 and 2, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing voice service diagnostics and provisioning, and, more particularly, to methods, systems, and apparatuses for implementing call center-based automated interface with voice switches for voice service diagnostics and provisioning, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a computing system 625a and corresponding database(s) 630a (similar to computing systems 105a and 205 and corresponding database(s) 110a and 210 of FIGS. 1 and 2, or the like) and user terminal 635 operated by user 640 (similar to user terminals 115a-115n and 215a operated by corresponding users 120a-120n and 220 of FIGS. 1 and 2, or the like), all of which may be disposed at call center 645 (similar to call center 125 and 225 of FIGS. 1 and 2, or the like). Alternative or additional to local computing system 625a and corresponding database(s) 630a, system 600 may further comprise remote computing system 625b and corresponding database(s) 630b (similar to computing system 105b and corresponding database(s) 110b of FIG. 1, or the like). System 600 may further comprise network(s) 655 over which a customer 650 may communicate with user terminal 635 at call center 645 using customer device 605 (e.g., user device 605a or 605b, or the like; similar to user devices 130a-130n and 230b and/or telephones 215b and 230a of FIGS. 1 and 2, or the like). In some cases, network(s) 655 may be the same as network(s) 610. Alternatively, network(s) 655 (e.g., a public switched telephone network ("PSTN"), or the like) may be different from network(s) 610 (e.g., a cellular phone network, a VoIP network, the Internet, or the like). System 600 may further comprise switch 660 (similar to switches 145a-145n and 245 of FIGS. 1 and 2, or the like) and node(s) 665 (similar to nodes 150a-150n and 250 of FIGS. 1 and 2, or the like), both of which may be disposed in network(s) 655, or the like. System 600 may further comprise user interface ("UI") 670 (similar to UIs 160a-160n and 260 of FIGS. 1 and 2, or the like) on user terminal 635 and billing database(s) 675 (similar to billing database(s) 165 and 265 of FIGS. 1 and 2, or the like).

In operation, computing system 625a and/or 625b (collectively, "computing system" or the like) may receive a request by a call center user (e.g., user 640, or the like) to access a voice service customer account on behalf of a customer (e.g., customer 650, or the like), the call center user being associated with the service provider that provides voice service to the customer. In response to receiving the request by the call center user to access the voice service customer account on behalf of the customer, the computing system may access information regarding the voice service customer account that is stored in a database (e.g., database(s) 630a and/or 630b, or the like). The computing system may identify at least one switch among a plurality of switches (e.g., switches 660, or the like) in a network (e.g., network(s) 655) that is configured to control voice service to a customer premises associated with the customer (e.g., customer premises, or the like), based at least in part on the accessed information. In some cases, the voice service may comprise a plain old telephone service or plain ordinary telephone system ("POTS") service, and the network may comprise a public switched telephone network ("PSTN").

The computing system may autonomously access the identified at least one switch and may determine whether any errors have been identified and logged by the identified at least one switch. Based on a determination that one or more errors have been identified and logged by the identified at least one switch, the computing system may autonomously initiate one or more repair procedures to address the identified one or more errors. For each identified error that has been addressed by the one or more repair procedures, the computing system may generate a first message indicating that said identified error has been addressed. For each identified error that cannot be addressed by the one or more repair procedures, the computing system may generate a second message indicating that said identified error requires additional repair procedures.

According to some embodiments, accessing the information regarding the voice service customer account that is stored in the database may comprise accessing the database via a first application programming interface ("API") between the computing system and the database, and autonomously accessing the identified at least one switch may comprise autonomously accessing the identified at least one switch via a second API between the computing system and each of the identified at least one switch.

In some embodiments, the one or more repair procedures may include, but are not limited to, at least one of: remote, network-based metallic line diagnostics and repair, initiated by the computing system, of copper lines between the identified at least one switch and the customer premises associated with the customer; remote, network-based switch level diagnostics and repair, initiated by the computing system, of the identified at least one switch; remote, network-based reconfiguration, initiated by the computing system, of the identified at least one switch; or remote, network-based reconfiguration, initiated by the computing system, of one or more nodes in the network that are communicatively coupled with the identified at least one switch; and/or the like.

According to some embodiments, the additional repair procedures may include, without limitation, at least one of: dispatching a technician associated with the service provider to perform on-site repair procedures at the customer premises; dispatching a technician associated with the service provider to perform on-site repair procedures at the at least one switch; or dispatching a technician associated with the service provider to perform on-site repair procedures at a physical location at which one or more nodes of the network are disposed.

Merely by way of example, in some cases, the accessed information regarding the voice service customer account may include, but is not limited to, at least one of: billing information associated with the voice service customer account; customer line information associated with the voice service customer account; line-specific information associated with the voice services provided to the customer; network profile information associated with the voice services provided to the customer; caller identification ("ID") name associated with the voice service customer account; identification information of each of the at least one switch; switch information for each of the at least one switch; information regarding active voice services among the voice services provided to the customer; information regarding one or more features of the active voice services among the voice services provided to the customer; information regarding inactive voice services among the voice services provided to the customer; information regarding one or more features of the inactive voice services among the voice services provided to the customer; information regarding voice service territory for the voice service provided to the customer; information regarding local dialing pattern; voicemail access number associated with the customer or the voice service customer account; information regarding message center login associated with the customer; information regarding any requested buried service wire ("BSW") tickets; or information regarding manual switch access for each of the at least one switch; and/or the like.

The computing system may generate and present a user interface ("UI"; e.g., a corresponding UI 670 among UIs 670 presented on corresponding user terminal 635 among the plurality of user terminals 635, or the like) displaying at least one of the accessed information regarding the voice service customer account, information regarding any identified errors that are logged by the at least one switch, the first message, or the second message, and/or the like. The computing system may generate and present one or more options within the UI for the call center user to select to change at least one of one or more features of the voice service customer account or one or more features of the voice service provided to the customer. In some instances, the UI may be generated and presented via a web portal to which the call center user is logged in.

In some embodiments, the one or more options for changing one or more features of the voice service customer account may include, without limitation, at least one of: one or more options for manually initiating switch login with the at least one switch; one or more options for editing billing information associated with the voice service customer account; one or more options for updating contact information for the customer; one or more options for performing a local dialing pattern search; or one or more options for changing the one or more features of the voice service customer account; and/or the like.

According to some embodiments, the one or more options for changing one or more features of the voice service may include, but are not limited to, at least one of: one or more options for adding, setting up, changing, or removing a call waiting feature of the voice service; one or more options for adding, setting up, changing, or removing a cancel call waiting feature of the voice service; one or more options for adding, setting up, changing, or removing a three-way calling feature of the voice service; one or more options for adding, setting up, changing, or removing an automatic answer feature of the voice service; one or more options for adding, setting up, changing, or removing a call forwarding with no answer feature of the voice service; one or more options for adding, setting up, changing, or removing a call forwarding with busy message feature of the voice service; one or more options for adding, setting up, changing, or removing a call trace feature of the voice service; one or more options for adding, setting up, changing, or removing an anonymous call reject feature of the voice service; one or more options for adding, setting up, changing, or removing a voicemail feature of the voice service; one or more options for adding, setting up, changing, or removing an Internet Protocol television ("IPTV") caller identification ("ID") screen pop-up feature of the voice service; one or more options for adding, setting up, changing, or removing a long distance toll or inter local access and transport area ("interLATA") feature of the voice service; one or more options for adding, setting up, changing, or removing a local long distance ("intraLATA") feature of the voice service; or one or more options for manually initiating switch login with the at least one switch; and/or the like.

In some embodiments, the computing system may autonomously access, from a billing database (e.g., billing database 675, which may be communicatively coupled on at least one of computing system 625*a* and/or 625*b*, and may be disposed either at call center 645 and/or in network(s) 655, or the like), billing information associated with the voice service customer account. The computing system may generate and present the billing information within the UI for the call center user.

Alternatively, or additionally, the computing system may receive one or more response messages in response to the call center user selecting at least one option among the one or more options. The computing system may generate and present the one or more response messages within the UI for the call center user. In some cases, the one or more response messages may include, without limitation, at least one of: a message indicating success without updated provisioning; a message indicating success with provisioning and available changes; a message indicating an application programming interface ("API") error; a message indicating a change feature error; a message indicating a missing nonce error; a message indicating an invalid nonce error; a message indicating success pertaining to NPA NXX; a message indicating success pertaining to telephone number ("TN") with no features; a message indicating success pertaining to TN with features and nonce; a message indicating an error pertaining to an unassigned TN with valid NPA NXX; a message indicating an error pertaining to an invalid NPA NXX; a message indicating an error pertaining to a missing required parameter; or a message indicating an error pertaining to an unsupported device; and/or the like.

In alternative aspects, the computing system may receive a request by a call center user to access a voice service customer account on behalf of a customer, the call center user being associated with a service provider that provides voice service to the customer. In response to receiving the request by the call center user to access the voice service customer account on behalf of the customer, the computing system may access information regarding the voice service customer account that is stored in a database. The computing system may identify at least one switch among a plurality of switches in a network that is configured to control voice service to a customer premises associated with the customer, based at least in part on the accessed information. The computing system may autonomously access, from a billing database, billing information associated with the voice service customer account. The computing system may integrate the accessed information regarding the voice service customer account with at least two of information regarding voice service provided to the customer, information regarding the identified switch, or the billing information associated with the voice service customer account, and/or the like. The computing system may generate and present a UI displaying the accessed information regarding the voice service customer account integrated with the at least two of the information regarding voice service provided to the customer, the information regarding the identified switch, or the billing information associated with the voice service customer account, and/or the like. The computing system may generate and present one or more options within the UI for the call center user to select to change at least one of one or more features of the voice service customer account or one or more features of the voice service provided to the customer, or the like.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   in response to receiving a request by a call center user to access a voice service customer account on behalf of a customer, accessing, using a computing system, information regarding the voice service customer account that is stored in a database, the call center user being associated with a service provider that provides voice service to the customer;
   identifying, using the computing system, at least one switch among a plurality of switches in a network that is configured to control voice service to a customer premises associated with the customer, based at least in part on the accessed information;
   autonomously accessing, using the computing system, the identified at least one switch, and determining, using the computing system, whether any errors have been identified and logged by the identified at least one switch;
   based on a determination that one or more errors have been identified and logged by the identified at least one switch, autonomously initiating, using the computing system, one or more repair procedures to address the identified one or more errors;
   for each identified error that has been addressed by the one or more repair procedures, generating, using the computing system, a first message indicating that said identified error has been addressed;
   for each identified error that cannot be addressed by the one or more repair procedures, generating, using the computing system, a second message indicating that said identified error requires additional repair procedures;
   generating and presenting, using the computing system, a user interface ("UI") displaying at least one of the accessed information regarding the voice service customer account, information regarding any identified errors that are logged by the at least one switch, the first message, or the second message; and
   generating and presenting, using the computing system, one or more options within the UI for the call center user to select to change at least one of one or more features of the voice service customer account or one or more features of the voice service provided to the customer.

2. The method of claim 1, wherein the computing system comprises at least one of a voice network diagnostics computing system, a voice network provisioning computing system, a voice network service management computing system, a call center computing system, a server computer, a webserver, a cloud computing system, or a distributed computing system.

3. The method of claim 1, wherein the voice service comprises a plain old telephone service or plain ordinary telephone system ("POTS") service, and wherein the network is a public switched telephone network ("PSTN").

4. The method of claim 1, wherein the UI is generated and presented via a web portal to which the call center user is logged in.

5. The method of claim 1, wherein accessing the information regarding the voice service customer account that is stored in the database comprises accessing the database via a first application programming interface ("API") between the computing system and the database, wherein autonomously accessing the identified at least one switch comprises autonomously accessing the identified at least one switch via a second API between the computing system and each of the identified at least one switch.

6. The method of claim 1, wherein the one or more repair procedures comprise at least one of:

remote, network-based metallic line diagnostics and repair, initiated by the computing system, of copper lines between the identified at least one switch and the customer premises associated with the customer;

remote, network-based switch level diagnostics and repair, initiated by the computing system, of the identified at least one switch;

remote, network-based reconfiguration, initiated by the computing system, of the identified at least one switch; or remote, network-based reconfiguration, initiated by the computing system, of one or more nodes in the network that are communicatively coupled with the identified at least one switch.

7. The method of claim 1, wherein the additional repair procedures comprise at least one of:

dispatching a technician associated with the service provider to perform on-site repair procedures at the customer premises;

dispatching a technician associated with the service provider to perform on-site repair procedures at the at least one switch; or dispatching a technician associated with the service provider to perform on-site repair procedures at a physical location at which one or more nodes of the network are disposed.

8. The method of claim 1, wherein the accessed information regarding the voice service customer account comprises at least one of:

billing information associated with the voice service customer account;

customer line information associated with the voice service customer account;

line-specific information associated with the voice services provided to the customer;

network profile information associated with the voice services provided to the customer;

caller identification ("ID") name associated with the voice service customer account;

identification information of each of the at least one switch;

switch information for each of the at least one switch;

information regarding active voice services among the voice services provided to the customer;

information regarding one or more features of the active voice services among the voice services provided to the customer;

information regarding inactive voice services among the voice services provided to the customer;

information regarding one or more features of the inactive voice services among the voice services provided to the customer;

information regarding voice service territory for the voice service provided to the customer;

information regarding local dialing pattern;

voicemail access number associated with the customer or the voice service customer account;

information regarding message center login associated with the customer;

information regarding any requested buried service wire ("BSW") tickets; or information regarding manual switch access for each of the at least one switch.

9. The method of claim 1, wherein the one or more options for changing one or more features of the voice service customer account comprise at least one of:

one or more options for manually initiating switch login with the at least one switch;

one or more options for editing billing information associated with the voice service customer account;

one or more options for updating contact information for the customer;

one or more options for performing a local dialing pattern search; or one or more options for changing the one or more features of the voice service customer account.

10. The method of claim 1, wherein the one or more options for changing one or more features of the voice service comprise at least one of:

one or more options for adding, setting up, changing, or removing a call waiting feature of the voice service;

one or more options for adding, setting up, changing, or removing a cancel call waiting feature of the voice service;

one or more options for adding, setting up, changing, or removing a three-way calling feature of the voice service;

one or more options for adding, setting up, changing, or removing an automatic answer feature of the voice service;

one or more options for adding, setting up, changing, or removing a call forwarding with no answer feature of the voice service;

one or more options for adding, setting up, changing, or removing a call forwarding with busy message feature of the voice service;

one or more options for adding, setting up, changing, or removing a call trace feature of the voice service;

one or more options for adding, setting up, changing, or removing an anonymous call reject feature of the voice service;

one or more options for adding, setting up, changing, or removing a voicemail feature of the voice service;

one or more options for adding, setting up, changing, or removing an Internet Protocol television ("IPTV") caller identification ("ID") screen pop-up feature of the voice service;

one or more options for adding, setting up, changing, or removing a long distance toll or inter local access and transport area ("interLATA") feature of the voice service;

one or more options for adding, setting up, changing, or removing a local long distance ("intraLATA") feature of the voice service; or one or more options for manually initiating switch login with the at least one switch.

11. The method of claim 1, further comprising:

autonomously accessing, using the computing system and from a billing database, billing information associated with the voice service customer account; and generating and presenting, using the computing system, the billing information within the UI for the call center user.

12. The method of claim 1, further comprising:

receiving, using the computing system, one or more response messages in response to the call center user selecting at least one option among the one or more options; and generating and presenting, using the computing system, the one or more response messages within the UI for the call center user;

wherein the one or more response messages comprise at least one of:
- a message indicating success without updated provisioning;
- a message indicating success with provisioning and available changes;
- a message indicating an application programming interface ("API") error;
- a message indicating a change feature error;
- a message indicating a missing nonce error;
- a message indicating an invalid nonce error;
- a message indicating success pertaining to NPA NXX;
- a message indicating success pertaining to telephone number ("TN") with no features;
- a message indicating success pertaining to TN with features and nonce;
- a message indicating an error pertaining to an unassigned TN with valid NPA NXX;
- a message indicating an error pertaining to an invalid NPA NXX;
- a message indicating an error pertaining to a missing required parameter; or
- a message indicating an error pertaining to an unsupported device.

13. An apparatus, comprising:
at least one processor; and
a non-transitory computer readable medium communicatively coupled to the at least one processor, the non-transitory computer readable medium having stored thereon computer software comprising a set of instructions that, when executed by the at least one processor, causes the apparatus to:
- in response to receiving a request by a call center user to access a voice service customer account on behalf of a customer, access information regarding the voice service customer account that is stored in a database, the call center user being associated with a service provider that provides voice service to the customer;
- identify at least one switch among a plurality of switches in a network that is configured to control voice service to a customer premises associated with the customer, based at least in part on the accessed information;
- autonomously access the identified at least one switch, and determine whether any errors have been identified and logged by the identified at least one switch;
- based on a determination that one or more errors have been identified and logged by the identified at least one switch, autonomously initiate one or more repair procedures to address the identified one or more errors;
- for each identified error that has been addressed by the one or more repair procedures, generate a first message indicating that said identified error has been addressed;
- for each identified error that cannot be addressed by the one or more repair procedures, generate a second message indicating that said identified error requires additional repair procedures;
- generate and present a user interface ("UI") displaying at least one of the accessed information regarding the voice service customer account, information regarding any identified errors that are logged by the at least one switch, the first message, or the second message; and
- generate and present one or more options within the UI for the call center user to select to change at least one of one or more features of the voice service customer account or one or more features of the voice service provided to the customer.

14. The apparatus of claim 13, wherein the apparatus comprises at least one of a voice network diagnostics computing system, a voice network provisioning computing system, a voice network service management computing system, a call center computing system, a server computer, a webserver, a cloud computing system, or a distributed computing system.

15. The apparatus of claim 13, wherein the voice service comprises a plain old telephone service or plain ordinary telephone system ("POTS") service, and wherein the network is a public switched telephone network ("PSTN").

16. A system, comprising:
a plurality of switches in a network;
a computing system, comprising:
  at least one first processor; and
  a first non-transitory computer readable medium communicatively coupled to the at least one first processor, the first non-transitory computer readable medium having stored thereon computer software comprising a first set of instructions that, when executed by the at least one first processor, causes the computing system to:
  - in response to receiving a request by a call center user to access a voice service customer account on behalf of a customer, access information regarding the voice service customer account that is stored in a database, the call center user being associated with a service provider that provides voice service to the customer;
  - identify at least one switch among the plurality of switches in the network that is configured to control voice service to a customer premises associated with the customer, based at least in part on the accessed information;
  - autonomously access the identified at least one switch, and determine whether any errors have been identified and logged by the identified at least one switch;
  - based on a determination that one or more errors have been identified and logged by the identified at least one switch, autonomously initiate one or more repair procedures to address the identified one or more errors;
  - for each identified error that has been addressed by the one or more repair procedures, generate a first message indicating that said identified error has been addressed;
  - for each identified error that cannot be addressed by the one or more repair procedures, generate a second message indicating that said identified error requires additional repair procedures;
  - generate and present a user interface ("UI") displaying at least one of the accessed information regarding the voice service customer account, information regarding any identified errors that are logged by the at least one switch, the first message, or the second message; and
  - generate and present one or more options within the UI for the call center user to select to change at least one of one or more features of the voice service customer account or one or more features of the voice service provided to the customer.

17. The system of claim 16, wherein the computing system comprises at least one of a voice network diagnostics computing system, a voice network provisioning computing system, a voice network service management computing system, a call center computing system, a server computer, a webserver, a cloud computing system, or a distributed computing system.

18. The system of claim 16, wherein the voice service comprises a plain old telephone service or plain ordinary telephone system ("POTS") service, and wherein the network is a public switched telephone network ("PSTN").

19. A method, comprising:

in response to receiving a request by a call center user to access a voice service customer account on behalf of a customer, accessing, using a computing system, information regarding the voice service customer account that is stored in a database, the call center user being associated with a service provider that provides voice service to the customer;

identifying, using the computing system, at least one switch among a plurality of switches in a network that is configured to control voice service to a customer premises associated with the customer, based at least in part on the accessed information;

autonomously accessing, using the computing system and from a billing database, billing information associated with the voice service customer account;

integrating, using the computing system, the accessed information regarding the voice service customer account with at least two of information regarding voice service provided to the customer, information regarding the identified switch, or the billing information associated with the voice service customer account;

generating and presenting, using the computing system, a user interface ("UI") displaying the accessed information regarding the voice service customer account integrated with the at least two of the information regarding voice service provided to the customer, the information regarding the identified switch, or the billing information associated with the voice service customer account; and generating and presenting, using the computing system, one or more options within the UI for the call center user to select to change at least one of one or more features of the voice service customer account or one or more features of the voice service provided to the customer.

20. The method of claim 19, wherein the computing system comprises at least one of a voice network diagnostics computing system, a voice network provisioning computing system, a voice network service management computing system, a call center computing system, a server computer, a webserver, a cloud computing system, or a distributed computing system.

* * * * *